UNITED STATES PATENT OFFICE.

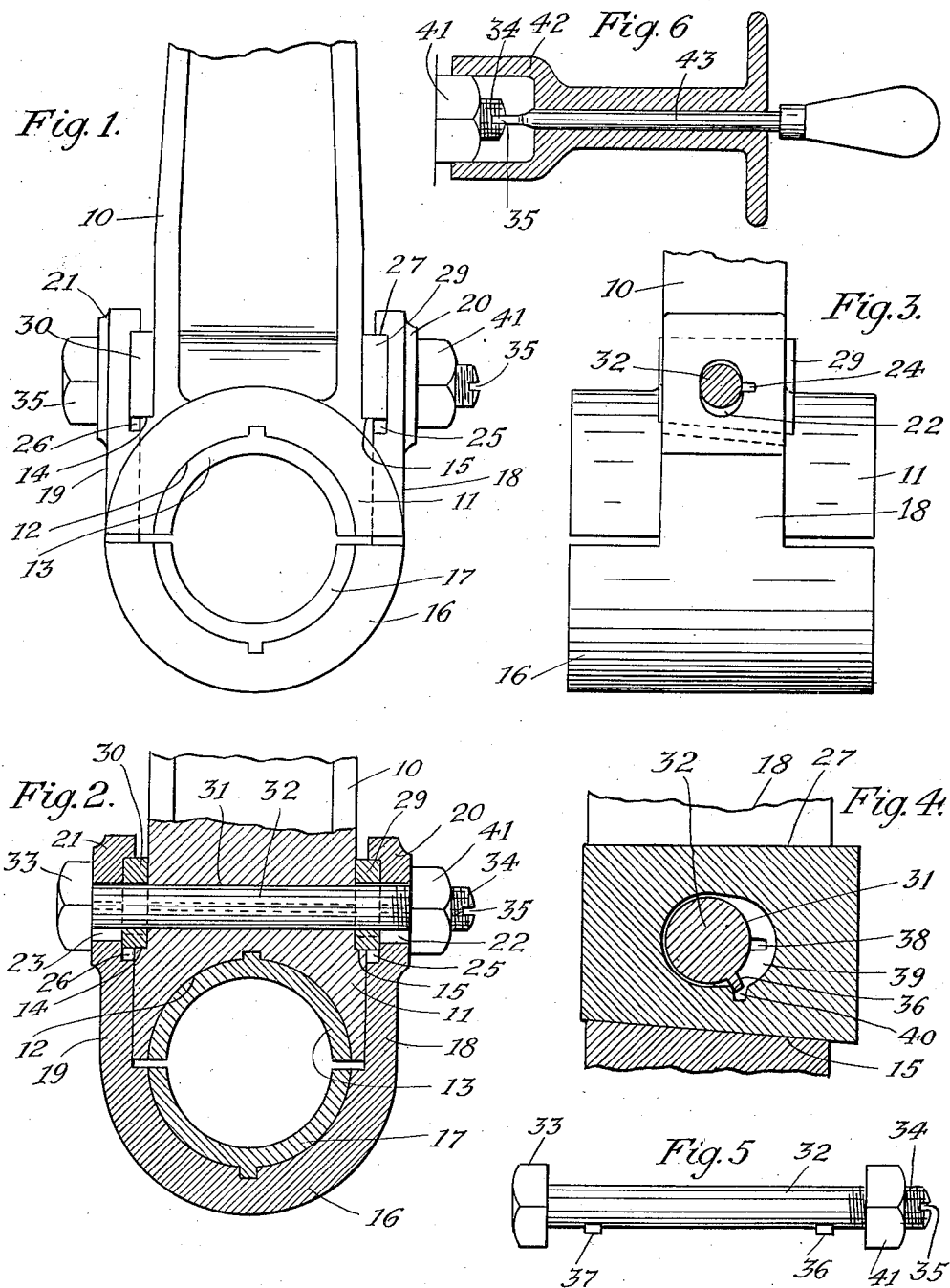

GEORGE T. STRITE, OF MINNEAPOLIS, MINNESOTA.

CONNECTING-ROD.

1,092,118.

Specification of Letters Patent. Patented Mar. 31, 1914.

Application filed March 1, 1912. Serial No. 680,865.

*To all whom it may concern:*

Be it known that I, GEORGE T. STRITE, a citizen of the United States, residing at Minneapolis, in the county of Hennepin and State of Minnesota, have invented certain new and useful Improvements in Connecting-Rods, of which the following is a specification.

My invention relates to connecting rods, primarily to connecting rods extending from the crank shaft of engines.

The primary object of my invention is to provide a connecting rod for the above purpose in which the bearing is formed of a two-part member, one being relatively movable along the other in combination with means for moving said members relatively to take up wear in the bushings without removing said bushings or taking off the connecting rod.

It is also an object of my invention in accomplishing this result to connect the relatively movable part of the bearing to the connecting rod proper by means which shall engage directly between projections on said relatively movable member and on the rod and which itself shall be capable of a movement transverse to the direction of the rod to effect the aforesaid movement, in combination with means for moving the connecting means which shall not receive any of the shock or strain incident to the direct thrust of the connecting rod, because said operating means itself forms no part of the connection between the movable bearing member and the rod.

The full objects and advantages of my invention will appear in connection with the detailed description thereof and are particularly pointed out in the claims.

In the drawings illustrating the application of my invention in one form,—Figure 1 is an end view of the bearing head of a connecting rod embodying my invention. Fig. 2 is a similar view taken in section through the said head. Fig. 3 is a side view of the parts shown in Fig. 1 with the operating bolt shown in section. Fig. 4 is a transverse section through one of the adjusting connecting keys. Fig. 5 is a view of the bolt for operating the said keys. Fig. 6 is a partly sectional view of a combination wrench for use in connection with my invention.

The shank 10 of the connecting rod is provided at its end with a bearing head 11 formed with a semi-cylindrical bearing cavity 12 in which is secured the usual half bushing 13. The head 11 has two opposite portions providing shoulders 14 and 15, as clearly shown in Figs. 1 and 2. A movable semi-cylindrical bearing block 16 provided with a complementary bushing 17 in reference to the bushing 13 of bearing head 11, is provided with straps 18 and 19, said straps having inner faces adapted to engage flush with corresponding faces extending at the sides of the bearing head 11, as most clearly shown in Fig. 2. Near the ends of the straps bosses 20 and 21 thicken the material of the same and through the center of said bosses are alining apertures 22 and 23 of elliptical shape, as most clearly shown in Fig. 3, each of said apertures having opening thereinto a short slot 24 extending through the thickness of the wall of the strap for a purpose later to be given. Across the insides of the straps 18 and 19 adjacent the aforesaid thickened portions are formed slots or keyways 25 and 26. These keyways provide top shoulders 27 and 28 and by reference to Fig. 4 it will be seen that the line of the shoulders on the straps relative to the line of the shoulders on the sides of head 11 are oblique. In the example shown in Fig. 4 the line of shoulder 27 is shown as parallel with the elements of the cylindrical bearing while the line of shoulder 15 is oblique thereto, but the same result obviously can be obtained by reversing this order or by having both of said lines obliquely disposed with respect to the elements of the bearing cylinder.

Adapted to seat in the slots 25 and 26 are key members 29 and 30 having their end walls obliquely-disposed at the same angles as the relative disposition of the walls of the shoulders on the rod head 11 and straps 18 and 19, respectively. When these key members are positioned as indicated in Figs. 1 and 2 the sides thereof engage the respective shoulders of the straps and rod head, thereby connecting the movable bearing member 16 to the rod head to complete the bearing. A bolt hole 31 extends transversely through the shank 10 in proper alinement with the oblong holes 22 and 23 in the straps when these straps are assembled. A bolt 32, as shown in Fig. 5, provided with a head 33, threaded end 34, screw slot 35 and wing teeth 36 and 37 extending outwardly from the sides thereof is inserted through the holes in the straps and said bolt hole. In order that the wing members 36 and 37 may pass through, the slots 24 are provided and a similar slot 38 extending from the bolt hole 31 to provide clearance, oblong holes 39 being formed in the key members corresponding to the holes 22 and 23 in the straps but having their longer dimension turned in the opposite direction, all as clearly shown in Fig. 4. This arrangement permits the bolt 32 to be assembled through the straps and the hole 31 in the shank head and the wing members 36 and 37 to be positioned in the holes 39 in the keys 29 and 30. As before stated these holes 39 have the longer dimension thereof extending longitudinally of the key members or transversely to the shank of the connecting rod. The keys 29 and 30 therefore may have movement across said bolt 32 and since the keys are in engagement with the walls of the shoulders on the straps and on the shank head, respectively, and the key walls are relatively oblique, it follows that such a movement of the keys will have a wedging action to cause the bearing member 16 to move inward toward the bearing head 11. Each of the oblique openings 39 in the key pieces 29 and 30 is provided with a notch or slot 40 extending from a point near the head of said openings and adapted to receive the wings 36 and 37, respectively, on the bolt 32, as shown in Fig. 4. Upon the threaded end 34 of bolt 32 a nut 41 is turned by using a wrench such as is shown in Fig. 6, that is a stem wrench 42 having a tubular handle through which projects a screwdriver 43. Whenever it is desired to tighten the bearing the stem wrench is applied to the nut 41 and the screw driver to the screw slot 35 on the end of bolt 32. By operating the stem wrench independently the nut 41 is loosened, then by turning the bolt 32 through the screw driver 43 the wings 36 and 37 are caused to engage against the wall of notches 40 and thereby simultaneously actuate the key members 29 and 30 to move transversely of the shank 10 and straps 18 and 19 with the result that the movable bearing head 16 is drawn toward the bearing head 11 and looseness in the bearing effectively taken up.

It is a point of material advantage in my device that the operation of the wings 36 and 37 upon the keys 29 and 30 is direct and not a wedging action, so that the ordinary strength of an operator applied to the screw driver 43, while ample to move the wedges to take up all looseness in the bearing, cannot force the wedges over so as to cause a binding of the bearing and consequent injury to the crank shaft, which is a common defect of other forms of devices for adjusting bearings to take up looseness therein. It will be noted that the bolt 32 which is the active operating member for actuating the key members 29 and 30, does not itself in any way directly support the movable bearing head 16, the walls of slots 22 and 23 not touching the periphery of the bolt at all. All of the connecting thrust between the movable bearing and the shank head 11 is transmitted directly through the keys 29 and 30. The bolt of course holds the straps tightly in engagement with the keys and thereby prevents change of position of the keys but the strain and shock of the thrust due to operation of the connecting rod is not borne by the bolt which therefore never becomes worn or distorted and always is in condition to perform its function.

I claim:

1. A connecting rod comprising a bearing head at the end thereof having plane faced outside walls, a movable bearing cap provided with straps overlying and engaging said faces, wedge keys having a bearing between the head and a portion of said straps for connecting the bearing cap to the bearing head, a bolt extending through the straps and rod for holding the straps and wedge keys in fixed relation on the rod, and means on the bolt for engaging the keys to move them transversely thereby to effect movement of the bearing cap.

2. A connecting rod comprising a bearing head at the end thereof, a movable bearing cap provided with straps engaging the outside faces of the bearing head, wedge keys having a bearing between the head and a portion of said straps for connecting the bearing cap to the bearing head, a bolt extending through the straps and rod for holding the straps and wedge keys in fixed relation to the rod, and teeth on the bolt meshing in corresponding notches on the keys, whereby turning of the bolt will move the keys transversely thereby to effect movement of the bearing cap.

3. A connecting rod comprising a bearing head at the end thereof, a movable bearing cap provided with straps engaging the outside faces of the bearing head, wedge keys having a bearing between the head and a portion of said straps for connecting the bearing cap to the bearing head, said wedge keys being formed with oblong apertures having a notch extending from one side thereof, a bolt extending through the straps, rod and said oblong apertures for holding the straps and wedge keys in fixed relation to the rod, and teeth on the bolt meshing in said notches, whereby turning of the bolt will move the keys transversely thereby to effect movement of the bearing cap.

In testimony whereof I affix my signature in presence of two witnesses.

GEORGE T. STRITE.

Witnesses:
F. A. WHITLEY,
H. A. BOWMAN.